Patented Sept. 27, 1949

2,482,752

UNITED STATES PATENT OFFICE 2,482,752

PHARMACEUTICAL PREPARATIONS

Lloyd W. Hazleton, Falls Church, Va., assignor to Bio-Research, Inc., Washington, D. C., a corporation of Delaware No Drawing. Application February 4, 1946, Serial No. 645,483

7 Claims. (Cl. 167—58)

This invention relates to pharmaceutical preparations which are effective in the treatment of common head colds.

It is among the objects of the present invention to provide preparations, compounds and compositions for the purpose of treating common head colds. Another object of the invention is to provide such compositions in a form in which they can be conveniently introduced into the cavities of the head as by painting, as a spray or in drop form. Other objects of the invention will be apparent from the following more detailed description.

I have discovered that certain monazo compounds are especially valuable in combating the common head cold when the compounds are introduced in suitable form into the head cavities, such as the nasal passages. The compounds are made effective for the purposes stated by way of compositions comprising water solutions of the azo compounds. Preferably, the solutions are made isotonic by means to be hereinafter described, and it has been discovered further that the effectiveness of all such solutions can be improved by the presence of a wetting agent in the solution.

The invention will be more fully set forth in the following more detailed description which includes examples which are given as illustrative embodiments of the invention and not as limitations thereof. Parts are expressed in parts by weight unless otherwise noted.

Example 1

Disodium hydrogen phosphate containing two molecules of water ($Na_2HPO_4.2H_2O$) and potassium dihydrogen phosphate ($KH_2PO_4$) were dissolved in 100 parts of distilled water to make a solution having a pH value of about 6.5 to about 7.5. This required 0.635 part of $Na_2HPO_4$ or 0.795 part of $Na_2HPO_4.2H_2O$ and 0.323 part of potassium phosphate. Then 0.1 part of a wetting agent composed of a sulfonated long chain fatty alcohol having about 12 carbon in the chain, known commercially as "Dupanol," was dissolved in 100 cubic centimeters of the solution and finally 3.0 parts of the disodium salt of 5-(para-sulfo-phenyl azo)-salicylic acid were dissolved in the solution. The resulting colored solution was approximately isotonic. It had a pH value within the range of 6.5 to 7.5 and a surface tension between 30 to 50 dynes per centimeter.

As compared with solutions of the azo compound which were devoid of the wetting agent, the above described solution was more effective when used as nasal drops or as a gargle than solutions which were devoid of wetting agent.

The compound 5-(para-sulfo-phenyl azo)-salicylic acid may be made by coupling the diazo of para-sulfo-aniline with salicylic acid in equimolecular proportions in alkaline medium by well known procedures.

Example 2

Another effective isotonic preparation, having a pH value and surface tension similar to that described in Example 1, was made by the procedure described in Example 1 except that the same proportion of the wetting agent composed essentially of a modified C-decyl betaine and containing some addition products was used instead of "Dupanol."

Similar results were obtained with similarly adjusted solutions which contained about 0.1 part per hundred to saturation of the azo compound. However, amounts of azo compound of about 0.1 to about 3 parts per hundred were found to be preferable for the purposes intended. The lower concentrations were found to be satisfactorily effective and generally more suitable for use on the more delicate membranes. The solutions containing the stated concentrations of the azo compound were sufficient to provide a persistence of the active ingredient on the membrane affected over considerably long periods of time. Only a slight increase in persistence is attained by use of still higher concentrations of the azo compound, although otherwise similar effects appeared to be produced by the presence of greater proportions of the azo compound.

The foregoing specified composition was also varied by using an excess of the wetting agent over that which produces a solution having a surface tension of 30 to 50 dynes per centimeter. Accordingly, a solution like that set forth above except that it contained 1 part of wetting agent, the pH value, tonicity and content of azo compound being about the same as that specified in the examples, was made. It was found that the large excess of wetting agent did not materially change the effectiveness of the composition. The wetting agent may be varied over a wide range, say about 0.01 to about 10 parts of wetting agent per 100 parts of the liquid composition. More than about 10 parts of wetting agent may be present but such an excessive amount over that necessary to produce the desired reduction in surface tension is unnecessary except that such an excess may be desirable in special circumstances to insure that the desired low surface tension will be retained until the composition is eventually eliminated from the area upon which it is disposed. The effect of the wetting agent is markedly noticeable when the surface tension is reduced to a value less than about 50 dynes per centimeter.

Any alkali salt of the azo compounds can be used to make the solutions, such as the fixed alkali salts and the ammonia salt, but the sodium or potassium salt is preferred.

The tonicity of the finished solution should be equivalent to about 0.9 part of sodium chloride per hundred in order that it be isotonic with body fluids and tissues. Isotonicity refers to solutions in which the salt concentrations are such that fluids will not be induced to pass from the body into the solution or from the solution into the body when the mucous membrane is wet with the solution. The pH of the finished solution should be about 6.5 to 7.5 in order to avoid irritation due to excessive acidity or alkalinity. When the indicated range of the pH value is attained in the solution by the addition of a proper combination of inorganic salts, these salts will also adjust the tonicity of the solution so that it will be approximately neutral with regard to pH and isotonic with the body fluids and membranes.

Many known different combinations of buffer compounds can be used in water solutions to produce the desired pH value. Any such combination can be used in the compositions provided they are compatible with the other essentials and they do not comprise reducing agents which would be deleterious to the azo compound in the composition and they do not comprise compounds which are toxic or irritant to the subject of treatment. The pH value of the solution is almost, if not wholly independent of the content of azo compound and organic wetting agent. However, substances which affect the pH of the solutions may be associated with these materials, such as inorganic salts which are sometimes present as diluents in azo compounds. In such case, suitable adjustment of the pH value and tonicity may be made. The preferred combinations of inorganic substances for adjusting the pH value in the present composition are combinations of disodium hydrogen phosphate and potassium dihydrogen phosphate. For example, combinations of salts such as potassium dihydrogen phosphate and sodium hydroxide, or sodium acetate and acetic acid, or any other combination which produces the desired pH value and does not have the deleterious effects noted, can be used. Solutions may be adjusted for isotonicity by the addition of various non-irritant non-toxic compounds, such as sodium chloride, sucrose or dextrose.

A wide choice of wetting agents is permissible and any of them can be used which is compatible and does not have an undesirable irritating effect on the membranes with which the compositions are to come in contact. Equivalent amounts of wetting agents such as the sulfonated long chain alcohols or wetting agents comprising various modified C-decyl-betaines may be used. Also, wetting agents such as those made by treating long chain hydrocarbon oils, such as petroleum distillates having boiling points somewhat approximating that of kerosene by a chlorinating-sulfonating process and then hydrolyzing, can be used. Further, there may be used wetting agents, such as the reaction products made by substituting alkyl chains in place of the chlorine of benzene sulfonyl chloride, and wetting agents which are sulfonated compounds having an aromatic nucleus and an alkyl side chain, can also be advantageously used in the compositions.

I claim:

1. A pharmaceutical composition being a water solution containing an alkali salt of 5-(para-sulfo-phenyl azo)-salicylic acid, a wetting agent, and a content of non-irritating non-toxic non-oxidizing inorganic salts sufficient to produce isotonicity.

2. An isotonic composition in accordance with claim 1 which contains a wetting agent, said solution having a surface tension at least as low as 30 to 50 dynes per centimeter.

3. A pharmaceutical composition being a water solution containing at least 0.1 part per hundred of the disodium salt of 5-para-sulfo-phenyl azo)-salicylic acid, and a content of non-irritating non-toxic non-oxidizing inorganic salts sufficient to produce isotonicity.

4. An isotonic composition in accordance with claim 3 which contains a wetting agent sufficient to reduce the surface tension of the solution to a value at least as low as about 50 dynes per centimeter.

5. A pharmaceutical composition being a water solution containing in 100 parts of the solution at least 0.1 part of the disodium salt of 5-(para-sulfo-phenyl azo)-salicylic acid, and a buffer containing disodium hydrogen phosphate and potassium dihydrogen phosphate sufficient to produce a pH value of about 6.5 to about 7.5.

6. A pharmaceutical composition being a water solution containing in 100 parts of the solution at least 0.1 part of the disodium salt of 5-(para-sulfo-phenyl azo)-salicylic acid, about 0.635 part of disodium hydrogen phosphate and about 0.323 part of potassium dihydrogen phosphate.

7. A composition in accordance with claim 6 which contains a non-irritating non-toxic wetting agent at least sufficient to reduce the surface tension to about 30 to about 50 dynes per centimeter.

LLOYD W. HAZLETON.

REFERENCES CITED

The following references are of record in the file of this patent:

UNITED STATES PATENTS

| Number | Name | Date |
|---|---|---|
| 1,995,776 | Nitardy | Mar. 26, 1935 |
| 2,369,711 | Blythe | Feb. 20, 1945 |
| 2,375,905 | Engelhard | May 15, 1945 |

OTHER REFERENCES

Beilstein, Handbook of Organic Chemistry, page 278, 4th ed., vol. 16.

Tozer et al., J. A. P. A., Scientific Edition, July 1941, pages 189–191.

Bryce, J. A. P. A., March 1935, pages 241–247.